(12) United States Patent　(10) Patent No.: US 7,590,789 B2
Rashid　(45) Date of Patent: Sep. 15, 2009

(54) OPTIMIZING CLOCK CROSSING AND DATA PATH LATENCY

(75) Inventor: Mamun Ur Rashid, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 11/999,929

(22) Filed: Dec. 7, 2007

(65) Prior Publication Data

US 2009/0150586 A1　Jun. 11, 2009

(51) Int. Cl.
*G06F 13/00* (2006.01)
*G06F 1/12* (2006.01)

(52) U.S. Cl. .......................... 710/310; 710/52; 710/55; 710/58; 710/61; 711/167; 713/400; 713/500; 713/503

(58) Field of Classification Search .................... 710/52, 710/55, 58, 61, 310; 711/167; 713/400, 713/500, 503
See application file for complete search history.

(56) References Cited

U.S. PATENT DOCUMENTS

| | | | |
|---|---|---|---|
| 7,245,684 B2 * | 7/2007 | Adkisson | 375/359 |
| 7,284,144 B2 * | 10/2007 | Surico | 713/600 |
| 7,305,058 B1 * | 12/2007 | Venkata et al. | 375/372 |
| 7,398,339 B1 * | 7/2008 | Davis et al. | 710/52 |
| 2004/0158688 A1 * | 8/2004 | Rentschler et al. | 711/167 |
| 2005/0144341 A1 * | 6/2005 | Schmidt et al. | 710/52 |
| 2007/0067594 A1 | 3/2007 | Rashid | 711/167 |
| 2008/0120457 A1 * | 5/2008 | Gillingham et al. | 711/105 |

OTHER PUBLICATIONS

U.S. Appl. No. 11/729,627, filed Mar. 29, 2007, entitled "Clock Synchronization Scheme For Deskewing Operations In A Data Interface," by Mamun Ur Rashid and Hing Y. To.

U.S. Appl. No. 11/978,811, filed Oct. 30, 2007, entitled "Optimizing Mode Register Set Commands," by Christopher Cox and Howard S. David.

* cited by examiner

*Primary Examiner*—Glenn A Auve
(74) *Attorney, Agent, or Firm*—Trop, Pruner & Hu, P.C.

(57) ABSTRACT

In one embodiment, the present invention includes a method for transmitting a predetermined data pattern from a first agent to a second agent of an interface, receiving an indication of correct receipt of the predetermined data pattern in a buffer of the second agent, determining in a state machine of the first agent an updated load position within a window of the predetermined data pattern at which the buffer can realize the correct receipt, and transmitting the updated load position to the second agent to enable the second agent to capture incoming data from the first agent at the updated load position. Other embodiments are described and claimed.

15 Claims, 3 Drawing Sheets

OPTIMIZING CLOCK CROSSING AND DATA PATH LATENCY

BACKGROUND

A typical memory controller of a computer system includes a memory interface, which establishes communication between the memory controller and a memory bus. Data on the memory bus typically is transmitted at very high speeds. Other internal circuitry of the memory controller operates at a different, e.g., lower frequency, as the internal circuitry may handle data in a parallel manner, while data on the memory bus is communicated serially. Thus there can be clock crossing issues between circuitry in different parts of the memory controller.

More specifically, a conventional memory interface of a memory controller may have a core partition, which furnishes the data that is to be written to the memory. An analog partition of the memory interface generates the clock and data signals that appear on the memory bus and an input/output (IO) partition contains deep first-in first-out (FIFO) buffers and circuitry to handle the clock domain transfer between the core and analog partitions. However, the FIFOs can become very large, consuming valuable chip real estate, as well as increasing power consumption levels. Further needed circuitry and the uncertainty of parameters of a particular system operation cause designers to set a fixed transmit clock to transmit data from the IO portion at a level that leads to a high latency (from the time that data is received in the IO portion until it is transmitted onto the interconnect).

DETAILED DESCRIPTION

In various embodiments, an adaptive clock crossing and latency optimization scheme for a data path may be realized. In this scheme a replica data path is used along with a programmable load generation (i.e., to generate a load signal which defines a data capture window in an input/output (IO) stage), a data compare logic (to compare captured data against known/stored data), and a state machine, to optimize latency and guarantee data crossing from a core domain to an IO domain.

Figure 1:
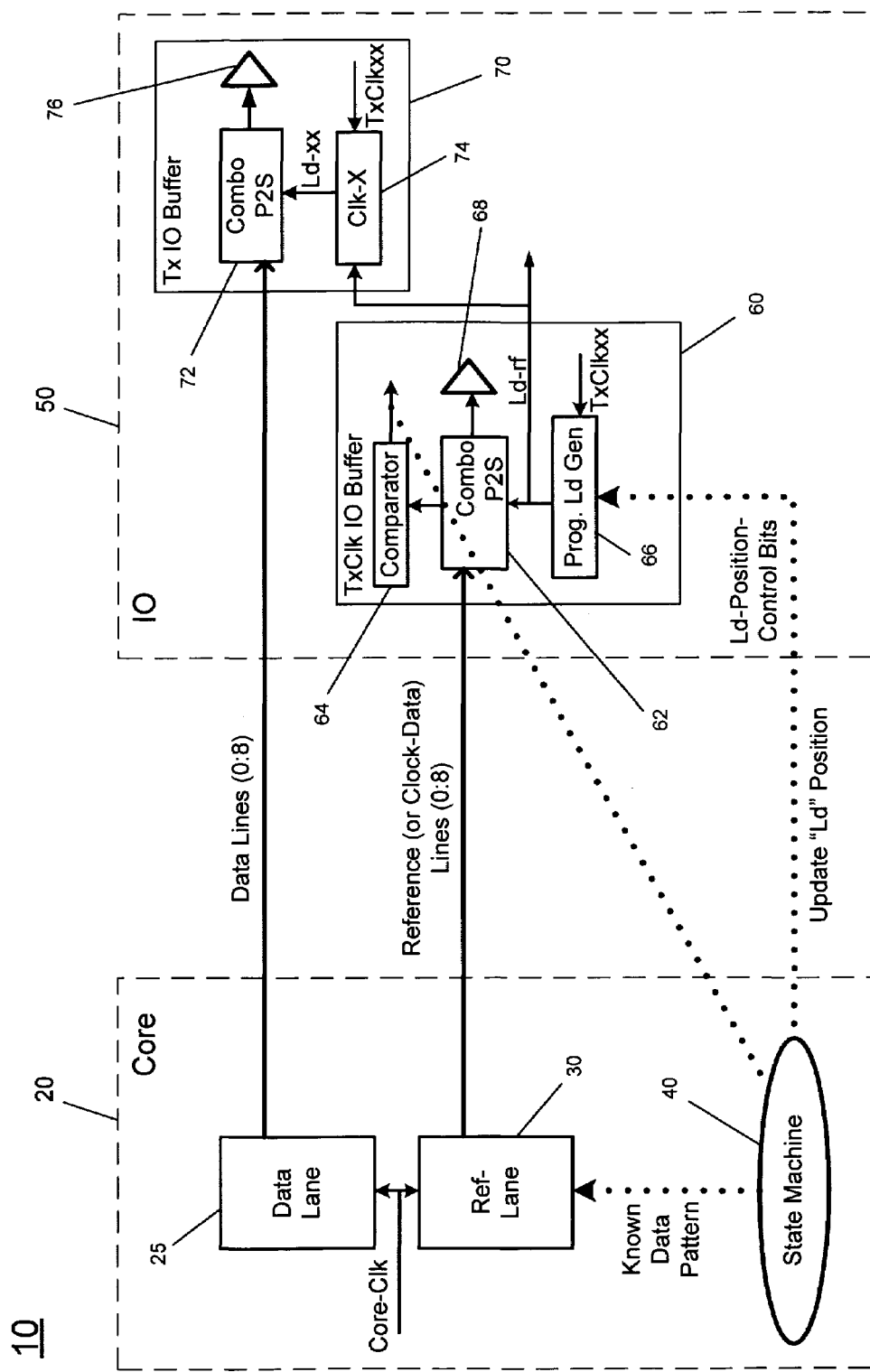
FIG. 1 is a block diagram of a portion of an interface in accordance with an embodiment of the present invention.

Referring now to FIG. 1, shown is a block diagram of a clock crossing interface in accordance with an embodiment of the present invention. As shown in FIG. 1, interface 10 includes a core 20 (also referred to as a first agent), which may be a core of a memory controller, IO controller or other such processing circuitry, and an IO stage 50 (also referred to as a second agent), which may be an IO port to be coupled to an interconnect such as a memory bus. In turn, the memory bus is coupled to a receiving device such as a memory or any other processing circuitry. In the embodiment of FIG. 1, first agent 20 includes a data lane 25 that is clocked by a core clock (Core-Clk). Data lane 25 may be configured to transmit data along a plurality of parallel interconnect lines (e.g., Data Lines (0:8)), although the scope of the present invention is not limited in this regard. Furthermore, first agent 20 includes a reference lane 30 which may correspond to a clock lane. Reference lane 30 is also controlled by Core-Clk to transmit a plurality of signal information across a reference path via a plurality of Reference (or Clock-Data) Lines (0:8). First agent 20 also includes a state machine 40 which may control the adaptive clock crossing and data-path latency optimization process. Thus as shown in FIG. 1, typically lines for clock lanes that are used to transmit clock signals during normal operation can be used for the replica data path during the optimization process (clocks are typically available for groups of data throughout the interface), avoiding the need for creating separate replica data path/wires. In yet other embodiments, e.g., where clock lanes or a replica path are not present, regular data lanes can be used for transmitting signal information during the optimization process, which may be performed prior to sending data. State machine 40 sends out a known data pattern through reference lane 30 along a data path, and the data is captured in second agent 50 during the optimization process.

Referring still to FIG. 1, second agent 50 includes first and second IO buffers 60 and 70, each of which is associated with a bit line of a corresponding interconnect. In the embodiment of FIG. 1, buffer 60 is a transmit IO buffer for the transmit clock (TxClkxx) while buffer 70 is the buffer for transmit input/output signals. As shown in FIG. 1, buffer 60 may include a conversion logic 62 to receive incoming parallel data and convert it to serial form, where it is transmitted out of second agent 50 through a driver 68 as an output signal on an external pad terminal of interface 10, which is connected to a corresponding line of the interconnect. Conversion logic 62 may include a minimal FIFO buffer (e.g., having 2-4 entries, in some embodiments). As described above, during normal operation this line corresponds to a clock line.

During the optimization process, the data sent along the reference path, which may correspond to the known data pattern is provided to a comparator 64 for comparison to a stored data pattern. Note further a programmable load generator 66 is present to receive an internal clock signal (Tx-Clkxx). Programmable load generator 66 is further configured to receive an updated load position from state machine 40 and to generate a load reference signal (Ld-rf) that is provided to conversion logic 62, as well as to a clock controller 74 of buffer 70. Buffer 70 includes a similar conversion logic 72 to receive incoming parallel data and convert it to serial format for passing out of interface IO and onto a corresponding line of the interconnect through a driver 76, under control of a load signal Ld-xx from clock controller 74 that in turn is generated responsive to the Ld-rf signal and the internal transmit clock TxClkxx.

In operation of the optimization process, the predetermined data pattern generated by state machine 40 and transmitted through reference lane 30 may be received in buffer 60, processed in conversion logic 62 and provided to comparator 64, where it is compared against the known pattern, and a pass-fail indicator is sent back to state machine 40. State machine 40 can dynamically adjust the position within a data capture window through control signals (i.e., load position control bits) from state machine 40. More specifically, the load position may be generated locally off of TxClkxx and the load position control bits to place the load position at an optimum location within a valid data capture window, and which also provides minimum latency for that particular die and operating environment. As shown below in FIG. 2, this load position can be set substantially within a middle portion of the incoming data window to reduce latency. State machine 40 can run continuously or periodically to monitor changes in the capturing widow, as this process optimizes latency across process, voltage and temperature. Thus as shown in FIG. 1, comparator 64 provides a feedback path to state machine 40 to indicate when the correct data is captured such that state machine 40 can determine the optimum load position (i.e., phase) within the data window that can capture the correct data, and responsive to the determination, state machine 40 transmits the updated load position via the load-position control bits to programmable load generator 66.

Figure 2:
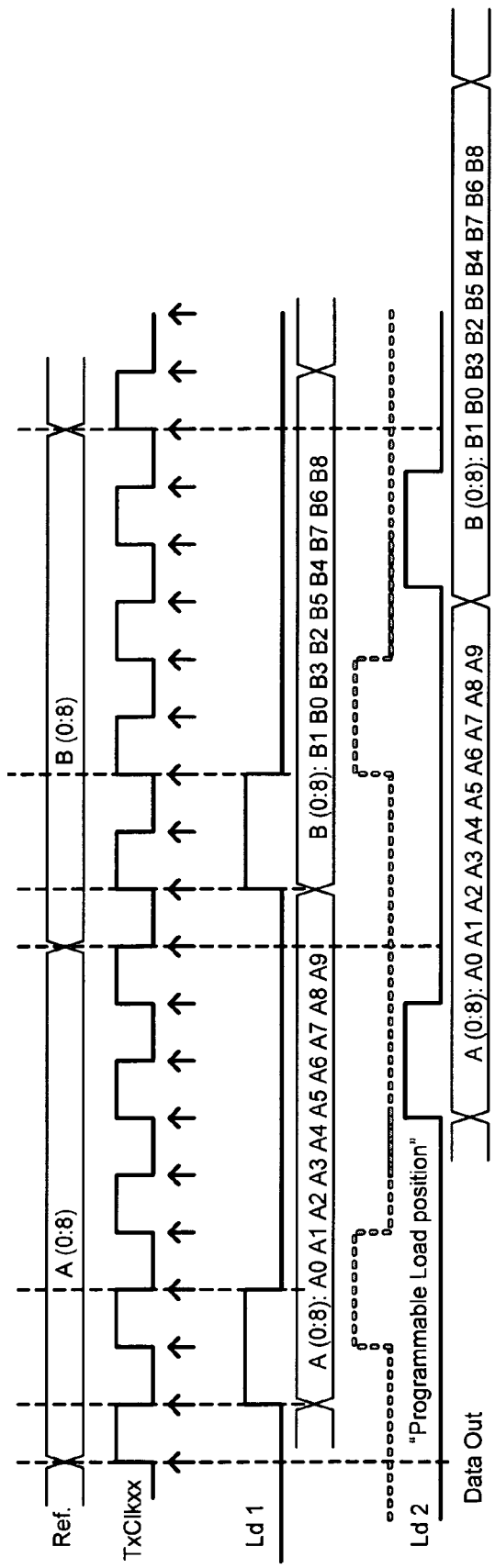
FIG. 2 is a timing diagram of operations in accordance with one embodiment of the present invention.

Referring now to FIG. 2, shown is a timing diagram of operations in accordance with one embodiment of the present invention. As shown in FIG. 2, reference data (Ref) which may correspond to a predetermined data pattern from state machine 40 is transmitted along the reference path. Initially, incoming data in second agent 50 is latched on a rising edge of a load signal, Ld, that occurs with respect to a given clock cycle of the internal clock, TxClkxx. However, because of various clock crossing issues, latencies, interconnect physical limitations and so forth, incorrect data may be received if the load position is set forth at load position 1 (Ld 1). Accordingly, state machine 40 may cause the generation of an updated load position, Ld2, to place the load position at an optimum location with respect to the location of valid data and/or to minimize a latency such that the correct incoming data is received and passed through buffer 60, as indicated at Data Out in FIG. 2.

Thus using embodiments of the present invention, a latency optimization scheme is realized. More specifically, this scheme may issue a known data pattern from a core through a replica lane (or through a clock lane). Inside the IO device a local load captures the core data and compares it to an expected data pattern, and sends back pass-fail information to the state machine. The state machine then dynamically adjusts the load position (capture window) across a data valid window, and identifies an appropriate region. More specifically, the state machine places the "load position" at an optimum location (e.g., middle of data valid window or to minimize latency). In some embodiments, the state machine executes once during boot-up or wakes up and runs periodically or runs continuously (to track dynamic voltage and temperature drifts).

Through this process latency can be learned (through training), and optimized for a specific part and specific operating conditions. Training can occur continuously, or can be done periodically, or can happen once during powerup, depending on target system needs. Note that the optimization described herein may avoid the need to provide and use deep first-in first-out (FIFO) buffers, to absorb all process, voltage, temperature (PVT) conditions, differences and clock domains uncertainties (e.g., jitter, skews, drifts), as such solutions suffer from higher latency, higher clock loading and higher power consumption.

In contrast, embodiments do not suffer from these drawbacks. Furthermore, embodiments may utilize an existing clock path (or strobe path), physical wires and hardware (or replica path) to reduce chip area and realize process (silicon) and operating condition tracking. Still further, highly reduced, or optimized data path latency (less levels of circuitry) can be realized using lower power and clock loading (since additional conversion and deep FIFO levels can be avoided). Data path latency optimization, through replica data path (or re-use of a clock path) and going through a learning sequence may enhance determinism for a system and tester.

Figure 3:
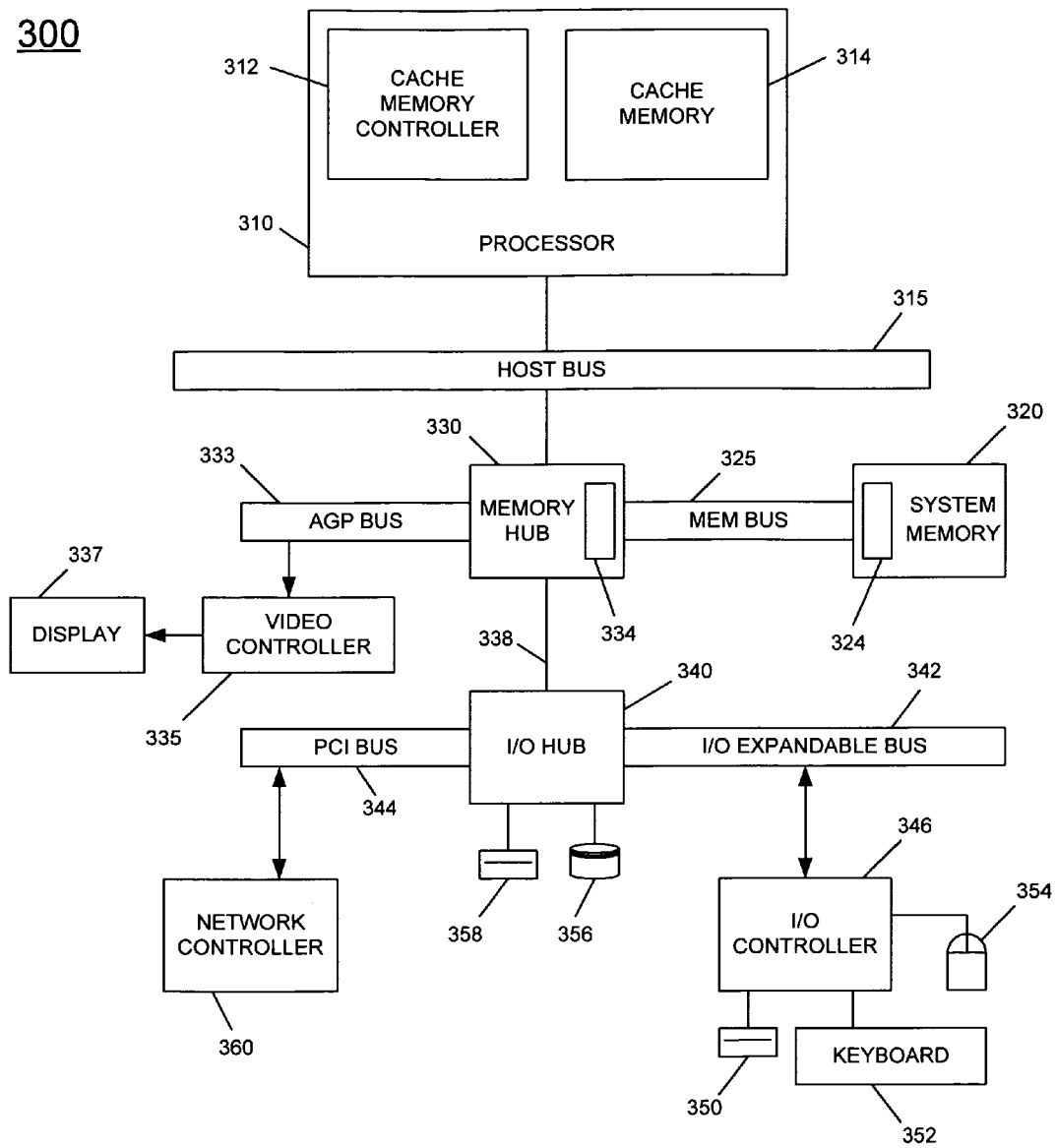
FIG. 3 is a block diagram of a computer system in accordance with one embodiment of the present invention.

Embodiments may be used in various systems. FIG. 3 is a block diagram of a computer system 300 in which embodiments of the invention may be used. As used herein, the term "computer system" may refer to any type of processor-based system, such as a notebook computer, a server computer, a laptop computer, or the like.

Now referring to FIG. 3, in one embodiment, computer system 300 includes a processor 310, which may include a general-purpose or special-purpose processor such as a microprocessor, microcontroller, a programmable gate array (PGA), and the like. Processor 310 may include a cache memory controller 312 and a cache memory 314. Processor 310 may be coupled over a host bus 315 to a memory hub 330 in one embodiment, which may be coupled to a system memory 320 (e.g., a dynamic RAM) via a memory bus 325. Memory hub 330 may also be coupled over an Advanced Graphics Port (AGP) bus 333 to a video controller 335 that is coupled to a display 337. Both memory hub 330 and system memory 320 which may include interfaces 334 and 324, respectively, may be configured to operate in accordance with an embodiment of the present invention, such as the circuit described in FIG. 1. Other interfaces may provide for optimization in accordance with an embodiment of the present invention, such as a Peripheral Component Interconnect (PCI)-Express, serial advanced technology attachment (SATA), double data rate (DDR), front side bus (FSB) or other such interfaces.

Memory hub 330 may also be coupled (via a hub link 338) to an input/output (IO) hub 340 that is coupled to an input/output (IO) expansion bus 342 and a PCI bus 344, as defined by the PCI Local Bus Specification, Production Version, Revision 2.1 dated June 1995.

IO expansion bus 342 may be coupled to an IO controller 346 that controls access to one or more IO devices. As shown in FIG. 3, these devices may include in one embodiment storage devices, such as a floppy disk drive 350 and input devices, such as a keyboard 352 and a mouse 354. IO hub 340 may also be coupled to, for example, a hard disk drive 358 and a compact disc (CD) drive 356, as shown in FIG. 3. It is to be understood that other storage media may also be included in the system.

PCI bus 344 may also be coupled to various components including, for example, a network controller 360 that is coupled to a network port (not shown). Additional devices may be coupled to the IO expansion bus 342 and the PCI bus 344. Although the description makes reference to specific components of system 300, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

transmitting a predetermined data pattern from a first agent to a second agent of an interface coupled to an interconnect via a first reference path;

receiving an indication of correct receipt of the predetermined data pattern in a buffer of the second agent, wherein the predetermined data pattern is received in the buffer responsive to a load position determined by the second agent;

determining in a state machine of the first agent an updated load position within a window of the predetermined data pattern at which the buffer can realize the correct receipt; and transmitting the updated load position from the state machine to the second agent to enable the second agent to capture incoming data from the first agent at the updated load position.

2. The method of claim 1, further comprising receiving the incoming data from the first agent in a second buffer of the second agent via a data path, the second buffer controlled by the updated load position, and outputting the incoming data along the interconnect responsive to the updated load position and an internal clock of the second agent.

3. The method of claim 2, wherein the first agent comprises a core portion of the interface and the second agent comprises an input/output stage of the interface, wherein the interface comprises a chipset coupled to a memory by the interconnect.

4. The method of claim 3, further comprising transmitting the predetermined data pattern, receiving the indication, determining in the state machine, and transmitting the updated load position during initialization of the interface.

5. The method of claim 4, further comprising transmitting the predetermined data pattern, receiving the indication, determining in the state machine, and transmitting the updated load position, periodically after the interface initialization to dynamically optimize latency across process, voltage and temperature.

6. The method of claim 5, further comprising dynamically optimizing the latency by capturing the incoming data in a conversion logic of the second buffer at a substantial midpoint of a data valid window of the incoming data.

7. The method of claim 2, wherein the first reference path corresponds to a clock signal path to transmit a clock signal during normal operation.

8. An apparatus comprising:

a core portion of an interface including at least one data lane and at least one reference lane each clocked by a common core clock and a state machine to provide a predetermined data pattern to the reference lane during an optimization process, wherein the state machine is to receive an indication of correct receipt of the predetermined data pattern in a clock buffer of an input/output (IO) portion of the interface coupled to the core portion and determine an updated load position within a valid window of the predetermined data pattern at which the clock buffer can realize the correct receipt; and the IO portion having a data buffer to receive data from the at least one data lane and to transmit the data onto an interconnect coupled to the interface.

9. The apparatus of claim 8, wherein the interface comprises a memory interface of a memory controller, wherein the interconnect comprises a memory bus coupled to a memory.

10. The apparatus of claim 9, wherein the data buffer is to receive the data from the core portion via the at least one data lane, the data buffer controlled by the updated load position and to output the data along the interconnect responsive to the updated load position.

11. The apparatus of claim 10, wherein the reference lane corresponds to a clock signal path used to transmit a clock signal during normal operation.

12. The apparatus of claim 11, wherein the state machine is to transmit the predetermined data pattern, receive the indication, and determine the updated load position during initialization of the interface.

13. The apparatus of claim 12, wherein the state machine is to transmit the predetermined data pattern, receive the indication, and determine the updated load position periodically after the interface initialization to dynamically optimize latency across process, voltage and temperature.

14. The apparatus of claim 8, wherein the clock buffer includes a conversion logic to receive and convert the predetermined data pattern into a serial data pattern, a comparator coupled to the conversion logic to compare the serial data pattern to a stored data pattern and transmit a result of the comparison to the state machine.

15. The apparatus of claim 14, wherein the clock buffer further comprises a programmable load generator to receive an internal clock of the IO portion and load position control information from the state machine and to generate a load reference signal to provide to the data buffer to enable a clock controller of the data buffer to latch the data at a substantial midpoint of a valid window of the data responsive to the load reference signal and the internal clock.

* * * * *